P. H. CORDOVA.
PROTECTOR.
APPLICATION FILED JUNE 5, 1913.
1,097,538.
Patented May 19, 1914.
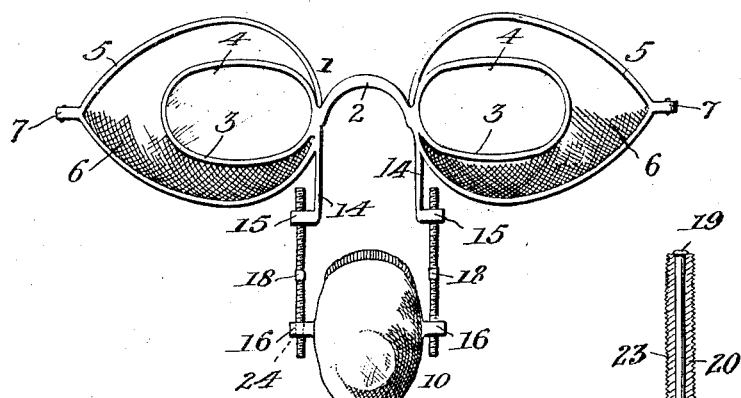
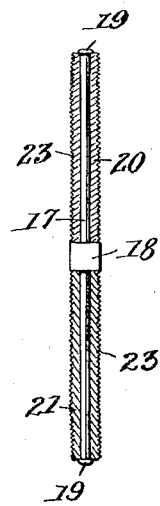
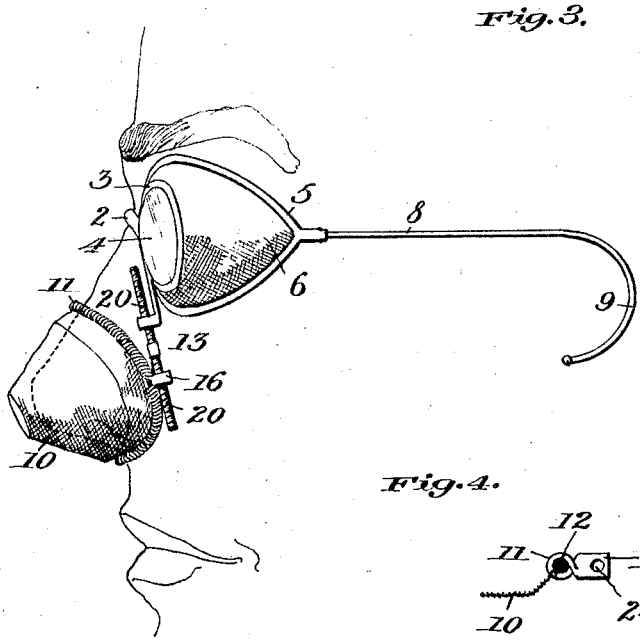
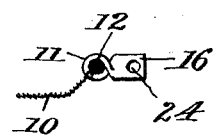
Witnesses
Inventor
Pablo Horacio Cordova
By Victor J. Evans
Attorney

UNITED STATES PATENT OFFICE.

PABLO HORACIO CORDOVA, OF HABANA, CUBA.

PROTECTOR.

1,097,538.  Specification of Letters Patent.  Patented May 19, 1914.

Application filed June 5, 1913. Serial No. 771,866.

*To all whom it may concern:*

Be it known that I, PABLO HORACIO CORDOVA, a citizen of Cuba, residing at Habana, Cuba, have invented new and useful Improvements in Protectors, of which the following is a specification.

This invention relates to protecting devices for motorists or the like, and has for its primary object the provision of a device of this character which will include means for shielding the eyes and nose of the wearer and for minimizing the possibility of his inhaling dangerous quantities of dust and foreign matter and to prevent injury to the eyes by flying particles.

Another object of the invention is the provision of means for adjusting the nose shield and the eye shield relatively whereby to permit said parts to operatively accommodate themselves to the eyes and nose of the wearer.

A further object of the invention is the provision of means for positively holding the nose guard against accidental derangement while in use.

With these and other objects in view, the invention consists of certain novel features of construction, combination and arrangement of parts, as will be hereinafter described and claimed.

In the accompanying drawings:—Figure 1 is a front view of the protector; Fig. 2 is a front view of the same; Fig. 3 is a vertical longitudinal section through the adjusting means; and Fig. 4 is a transverse section through a portion of the nose protector.

The protector comprises an eye-guard, which may include a frame 1 having a nose bridge 2 and lens-rims 3, the latter having secured therein in any suitable well known manner lenses 4 and may be constructed of any suitable well known transparent material. The lens rims 3 of the frame 1 are mounted within guard frames 5, said frames being soldered or otherwise suitably secured to the lens rims 3. The space between the lens rims 3 and the guard frames 5 may be filled in with amber or any other suitable material 6 that will not obstruct the lateral vision of the eye. The guard-frames 5 have their sides diverging relatively in an outward direction and at the vertex of the sides, the frames have secured thereto lugs 7, to which are pivoted the forward ends of temple bars 8, the opposite ends of the bars being provided with the usual hooks 9 that are adapted to be extended around the ears of the wearer, as shown in Fig. 2, so as to hold the device in proper applied position.

The nose guard 10 is substantially of frusto-conical form and may be constructed of any suitable well known material, preferably cloth, and at its large end it has secured thereto a retaining or gripping device 11 in the form of a continuous spring having closely associated convolutions. Within the convolutions of the spring may be extended a continuous band of rubber 12, which is adapted to lend admirably to the gripping action of the device, so as to hold the guard 10 against accidental derangement while in use. The nose guard 10 and the eye-guard are adjustably connected by means 13, which may include rigid bars 14, which depend from the lens rims 3 and which terminate in lower lateral lugs 15. These lugs are superimposed relatively to similar lugs 16 at the sides of the nose guards 10.

The operating device for regulating the adjustment of the nose guard relatively of the eye-guard is in the form of companion rods 17 provided with intermediate lugs 18, end stops 19 and sleeves 20 and 21, said sleeves being interposed between the end stops 19 and the intermediate lugs 18 of said rods 17, and as illustrated the sleeves are threaded exteriorly, as at 23, for connection in corresponding passages 24 in the lugs 15 and 16.

From the construction of the adjusting means hereinabove referred to, it is evident that the sleeves 20 and 21 may be manually adjusted in their mating lugs 15 and 16, so that the nose guard 10 may be adjusted to the eye-guard and the parts thereby placed in proper position to operatively shield the nose and eyes of the wearer.

While the device is primarily intended as a protector for the eyes and nose of motorists, I wish it to be understood that I do not contemplate limiting the invention to such use, it being obviously understood that it may be admirably adapted for use by gunners, firemen, workmen in metal foundries or like places where it is desirable to protect the eyes and the nose from gaseous elements or fire and smoke.

Having thus described my invention, what I claim is:—

1. A protector comprising an eye-guard, a nose-guard, and means adjustably connecting the former with the latter.

2. A protector comprising an eye-guard having transparent portions, and a nose-guard adjustably suspended from the eye-guard.

3. A protector comprising an eye-guard, a nose-guard, and an adjustable threaded mounting connecting the former with the latter.

4. A protector comprising an eye-guard, temple bars carried thereby and provided with ear-engaging hooks, and a nose-guard suspended from said eye-guard.

5. A protector comprising an eye-guard, temple bars carried thereby and provided with ear-engaging hooks, and a nose-guard suspended from said eye-guard and adjustable relatively thereof.

6. A protector comprising an eye-guard, a nose-guard, and a nose-gripping portion carried by the nose-guard and yieldingly embracing the nose to hold the guard in an applied position.

7. A protector comprising an eye-guard, retaining means therefor, a nose guard suspended from the eye-guard, and means for retaining the nose guard in applied position.

8. A protector comprising an eye-guard, a nose-guard, lugs on the nose-guard, lugs on the eye-guard, and adjustable devices between the lugs of the eye-guard and the lugs of the nose-guard and operable for moving the eye-guard relatively of the nose-guard.

9. A protector comprising an eye-guard, retaining means therefor, a nose-guard suspended from the eye-guard, and a circumferentially yieldable gripping portion for embracing the nose and carried by the inner end of said nose guard.

In testimony whereof I affix my signature in presence of two witnesses.

PABLO HORACIO CORDOVA.

Witnesses:
 JAMES A. KOEHL,
 BENNETT S. JONES.